United States Patent [19]
Yumoto

[11] Patent Number: 5,401,142
[45] Date of Patent: Mar. 28, 1995

[54] CONDENSATE DISCHARGING DEVICE

[75] Inventor: Hideaki Yumoto, Kakogawa, Japan

[73] Assignee: TLV Co., Ltd., Kakogawa, Japan

[21] Appl. No.: 9,527

[22] Filed: Jan. 27, 1993

[30] Foreign Application Priority Data

Feb. 14, 1992 [JP] Japan .................................. 4-061411
Mar. 13, 1992 [JP] Japan .................................. 4-090010

[51] Int. Cl.⁶ .............................................. F04F 1/06
[52] U.S. Cl. .................................... 417/132; 417/135; 137/630.15
[58] Field of Search ............... 417/130, 131, 132, 133, 417/134, 135; 137/630.14, 630.15

[56] References Cited

U.S. PATENT DOCUMENTS

| | | | |
|---|---|---|---|
| 1,207,679 | 12/1916 | Boylan | 417/132 |
| 1,249,939 | 12/1917 | Falwell | 417/132 |
| 1,398,206 | 11/1921 | Sparks | 417/132 |
| 1,473,384 | 11/1923 | Rogers | 417/131 |
| 1,542,509 | 6/1925 | Kueny | 417/130 |
| 1,583,461 | 5/1926 | Harvey | 417/132 |
| 1,655,729 | 1/1928 | Jones | 137/630.14 |
| 1,657,679 | 1/1928 | Knudstrup . | |
| 1,672,610 | 6/1928 | Goff . | |
| 3,601,157 | 8/1971 | Milleville | 137/630.14 |
| 3,870,079 | 3/1975 | Finke et al. | 137/630.14 |
| 3,930,755 | 1/1976 | Lahr et al. | 417/130 |
| 4,342,328 | 8/1982 | Matta | 137/630.15 |
| 4,782,862 | 11/1988 | Nguyen | 137/630.14 |
| 5,141,405 | 8/1992 | Francart, Jr. | 417/133 |

FOREIGN PATENT DOCUMENTS

| | | |
|---|---|---|
| 50-147228 | 5/1974 | Japan . |
| 26407 | of 1911 | United Kingdom . |
| 12349 | 8/1916 | United Kingdom . |

OTHER PUBLICATIONS

Catalog for GestraPump (undated).
Catalog for Spirax Sarco pumps, 1990.

Primary Examiner—Richard A. Bertsch
Assistant Examiner—Roland G. McAndrews, Jr.
Attorney, Agent, or Firm—Jordan and Hamburg

[57] ABSTRACT

In order to enable only condensate to be discharged/fed under pressure without leaking out steam independently of the respective pressures at the primary side and at the secondary side, in a condensate discharging device comprising a condensate receiving chamber provided with a condensate inlet opening and a condensate outlet opening as well as an operating high pressure fluid inlet and outlet; a float disposed within the chamber and adapted to rise and drop along with the water level; an inlet valve connected to the float and used for opening and closing the inlet; an exhaust valve connected to the float and used for opening and closing the outlet; and check valves, one arranged at the condensate inlet opening and the other at the condensate outlet opening, the improvement comprises a valve mechanism connected to the float to open and close the outlet opening independently of the check valves, the valve mechanism being adapted to close the condensate outlet opening when the water level is low, and to open the condensate outlet opening when there is a rise in the water level, whereby after the float closes the inlet (8) and opens the high pressure fluid outlet the condensate is introduced from the condensate inlet opening into the chamber until the water level reaches a predetermined water level, and the high pressure fluid outlet is closed and the high pressure fluid inlet is opened, the condensate thereby being discharged from the opened condensate outlet opening when the predetermined water level is reached.

1 Claim, 5 Drawing Sheets

CONDENSATE DISCHARGING DEVICE

BACKGROUND OF THE INVENTION

The present invention relates to a condensate discharging device for discharging condensate produced in various kinds of equipment using steam and piping for steam, or for feeding the condensate under pressure to a boiler or an apparatus using waste heat.

Condensate condensed in equipment using steam is ordinarily discharged through a steam trap. However, in the case where the condensate is recovered to a place higher in pressure, such as a boiler or an apparatus utilizing waste heat, or in the case where the secondary pressure is higher than the primary pressure, like the case of discharging condensate within a vacuum into the atmosphere, the condensate can not be discharged using the steam trap.

In the case where the secondary pressure is higher than the primary pressure, a condensate discharging device (pumping trap) as disclosed in Japanese utility model laid-open publication sho-50-147228 is used. This device comprises a condensate receiving chamber provided with a condensate inlet opening and a condensate outlet opening, and a high pressure operating fluid (pressure gas) inlet and outlet. In the condensate receiving chamber, an open or closed type of float is set up so as to rise and drop according to the water level and is connected to an inlet valve for opening and closing the operating high pressure fluid inlet and to an exhaust valve for opening and closing the fluid outlet. Through the cooperation with respective check valves arranged at the condensate inlet and outlet openings, condensate is introduced into the condensate receiving chamber, after the operating high pressure fluid inlet is closed and the fluid outlet is opened, until the water level within the condensate receiving chamber reaches a predetermined level. When the predetermined level is reached, the operating high pressure fluid outlet is closed and the fluid inlet is opened, introducing the operating high pressure fluid into the condensate receiving chamber so that the action of pressure causes the condensate to be discharged from the opened outlet opening.

Furthermore, U.S. Pat. No. 5,141,405 discloses a device basically similar in construction to the above-described device.

Among the above-mentioned devices using steam, for example, in a heat exchanger for heating a fluid to be heated by steam, supply to the heat exchanger is carried out after the pressure of steam is controlled so as to maintain a temperature of the fluid to be heated delivered from the heat exchanger constant, which causes the primary pressure to rise to a pressure higher or fall to a pressure lower than the secondary pressure.

If the condensate discharging device disclosed in the above-mentioned utility model laid-open publication sho-50-147228 or U.S. Pat. No. 5,141,405 is mounted on such a piece of equipment using steam, a problem arises in that when the primary pressure rises to a pressure higher than the secondary pressure, the check valve arranged at the condensate outlet is always caused to be opened so that not only the condensate but also the steam under high pressure is flown out therethrough. Meanwhile, if an ordinary steam trap is mounted on such a device using steam, it will not be able to be used in the case where the primary pressure is lower than the secondary pressure.

SUMMARY OF THE INVENTION

An object of the invention is therefore to provide a condensate discharging device which enables only condensate to be discharged or fed under pressure without leaking out steam independently of the respective pressures at the primary side and at the secondary side.

To achieve the above-mentioned object, according to the present invention, there is provided a condensate discharging device comprising a condensate receiving chamber provided with a condensate inlet opening and a condensate outlet opening as well as an operating high pressure fluid inlet and outlet; a float of open or closed type disposed within said condensate receiving chamber and adapted to rise and drop along with the water level; an inlet valve connected to said float and used for opening and closing said fluid inlet; an exhaust valve connected to said float and used for opening and closing said fluid outlet; check valves, one arranged at said condensate inlet opening and the other at said condensate outlet opening; and a valve means connected to said float to open and close said condensate outlet opening independently of said check valves, said valve means being adapted to close said condensate outlet opening when the water level in said condensate receiving chamber is low, and to open said outlet opening when there is a rise in the water level, whereby after said float closes said fluid inlet and opens said fluid outlet, the condensate is introduced from said condensate inlet opening into said condensate receiving chamber, until the water level in said condensate receiving chamber reaches a predetermined water level, then said fluid outlet is closed and said fluid inlet is opened, the condensate thereby being discharged from the opened condensate outlet opening when said predetermined water level is reached.

The operation of the above-mentioned condensate discharging device is as follows.

In the case where the primary pressure is lower than the secondary pressure, the check valve arranged at the condensate outlet opening and the inlet valve for opening and closing the operating high pressure fluid inlet are closed, and the check valve arranged at the condensate inlet opening and the exhaust valve for opening and closing the exhaust outlet are opened, until the water level in the condensate receiving chamber reaches a predetermined water level. Condensate is introduced from the condensate inlet opening into the condensate receiving chamber and the float rises along with the rise in the water level. The rise of the float causes the valve means connected to the float to open the condensate outlet opening, but the check valve arranged at the condensate outlet opening keeps the valve closed. When a predetermined water level is reached in the condensate receiving chamber, the inlet valve is opened and the exhaust valve is closed. The operating high pressure fluid introduced from the fluid inlet brings about a rise of the pressure in the condensate receiving chamber, causing the check valve at the condensate outlet opening to open and discharging condensate from the condensate outlet opening. The float drops along with the fall in the water level due to discharge of condensate, and when it drops to a predetermined position, the inlet valve is closed and the exhaust valve is opened. Furthermore, the valve means closes the condensate outlet opening and, at the same time, the check valve at the condensate outlet opening is closed to stop the discharge of condensate. This operation is recycled so that the storage and discharge of condensate is repeated.

In the case where the primary pressure is higher than the secondary pressure, the respective check valves arranged at the condensate inlet and outlet openings are opened. The float rises and drops according to the water level in the condensate receiving chamber, so that the valve means closes and opens the condensate outlet opening, thereby discharging condensate therefrom.

BRIEF DESCRIPTION OF THE DRAWINGS

The above and other objects and features of the invention will be more apparent upon a reading of the following detailed specification and drawings, in which:

FIG. 1 is a sectional view showing the condition where a float is at the uppermost position;

FIG. 2 is a sectional view showing the condition where the float is at the lowermost position;

FIG. 3 is a sectional view showing the condition where the float is at the middle position and immediately before condensate is discharged;

FIG. 4 is a sectional view showing the condition where the float is at a middle position and condensate is being discharged.

DETAILED DESCRIPTION OF THE PREFERRED EMBODIMENTS

Now, the invention will be described in detail by way of embodiments with reference to the drawings showing the embodiments of the above-mentioned technical means.

Figure 1:
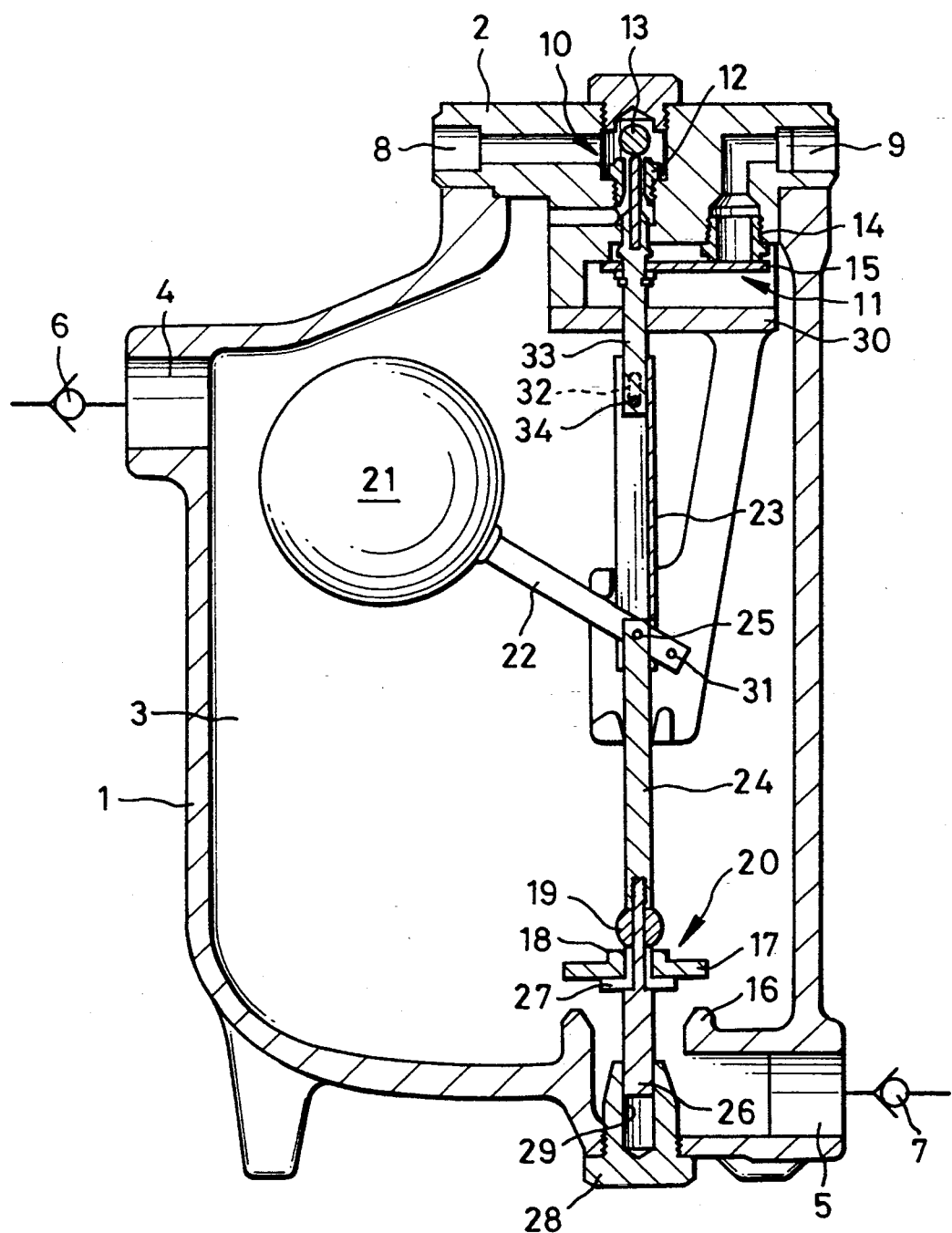
FIGS. 1 to 4 are sectional views of a condensate discharging device according to one embodiment of the invention and showing the state of operation when the primary pressure is lower than the secondary pressure.

Referring to FIG. 1, a condensate discharging device comprises a body 1 with a lid 2 mounted thereon by means of bolts (not shown), the inner hollow portion formed thereby being called a condensate receiving chamber 3. The body 1 is formed at the upper portion thereof with a condensate inlet opening 4 communicating with the condensate receiving chamber 3 and at the lower portion thereof with a condensate outlet opening 5. Check valves 6 and 7 are provided at the inlet opening 4 and the outlet opening 5, respectively. The lid 2 is formed with an inlet 8 and an outlet 9 for an operating high pressure fluid. The inlet 8 communicates with the condensate receiving chamber 3 through an inlet valve 10 and the outlet 9 communicates with the condensate receiving chamber 3 through an exhaust valve 11. The inlet valve 10 consists of an inlet valve seat 12 and an inlet valve body 13 which comes into and out of seating engagement with the inlet valve seat 12 to thereby close and open the inlet valve 10. The exhaust valve 11 consists of an exhaust valve seat 14 and an exhaust valve body 15 which comes into and out of seating engagement with the exhaust valve seat 14 to thereby close and open the exhaust valve 11. A main valve seat 16 is formed on the end of the condensate outlet opening 5, which opens toward the condensate receiving chamber 3. A main valve body 17, which comes into and out of seating engagement with the main valve seat 16 to thereby close and open the main valve, is disposed within the condensate receiving chamber 3, and is formed on the center portion thereof with a sub-valve seat 18, above which a sub-valve body 19, which is brought into and out of engagement with the sub-valve seat 18 to close and open the sub-valve, is disposed. The main valve seat 16 and the main valve body 17 as well as the sub-valve seat 18 and the sub-valve body 19 constitute a valve means 20 for closing and opening the condensate outlet opening 5.

A closed type of float 21 which rises and drops along with the water level is housed within the condensate receiving chamber 3. A lever 22 is secured at one end thereof to the float 21 and connected at the other end by means of a pin 25 to a connecting member 23 of a channel-like cross section extending upwardly and a float shaft 24 extending downwardly. A stepped guide rod 26 is threadably connected to the lower end of the float shaft 24. A plurality of L-shaped guide ribs 27 are formed integrally with the guide rod 26 on the lower region of the portion which has the smaller diameter down the float shaft 24 and, at the same time, a sub-valve body 19 is fitted on the portion of the guide rod 26 having a smaller diameter between the guide ribs 27 and the threaded connection, so that the float shaft 24, the guide rod 26, the sub-valve body 19 and the guide ribs 27 are formed like one piece. The main valve body 17 is slidably provided along the guide ribs 27 between the sub-valve body 19 and the supporting portion of the plurality of the guide ribs 27. The center hole of the main valve body 17 is somewhat larger in diameter than the portion of the guide rod 26 with t-he smaller diameter. As a result, when the sub-valve body 19 is brought into engagement with the sub-valve seat 18 formed on the Peripheral edge of the center hole of the main valve body 17, the communicating spaces between the adjacent guide ribs 27 are closed, and when the sub-valve body 19 and the sub-valve seat 18 are moved away from each other and the main valve body 17 is supported by the supporting portion of the guide ribs 27, the condensate receiving chamber 3 and the condensate outlet opening 5 communicate with each other through the above mentioned spaces. The lower portion of the guide rod 26 is guided by the center guide hole 29 of a plug 28 threadably connected to the body 1.

In the middle portion of the device, the front end of a lever 22 is rotatably connected by a pin 31 to a mounting member 30 secured to the lid 2. The pin 31 constitutes a fulcrum of the float 21. The connecting member 23 is provided at the upper end thereof with the free space 32 shown with a dotted line, and a pin 34 is attached to a valve stem 33 connected to an exhaust valve body 15 and loosely fitted in and connected to the free space 32.

Now, operation of the device will be explained with reference to FIGS. 1 to 4.

Figure 2:
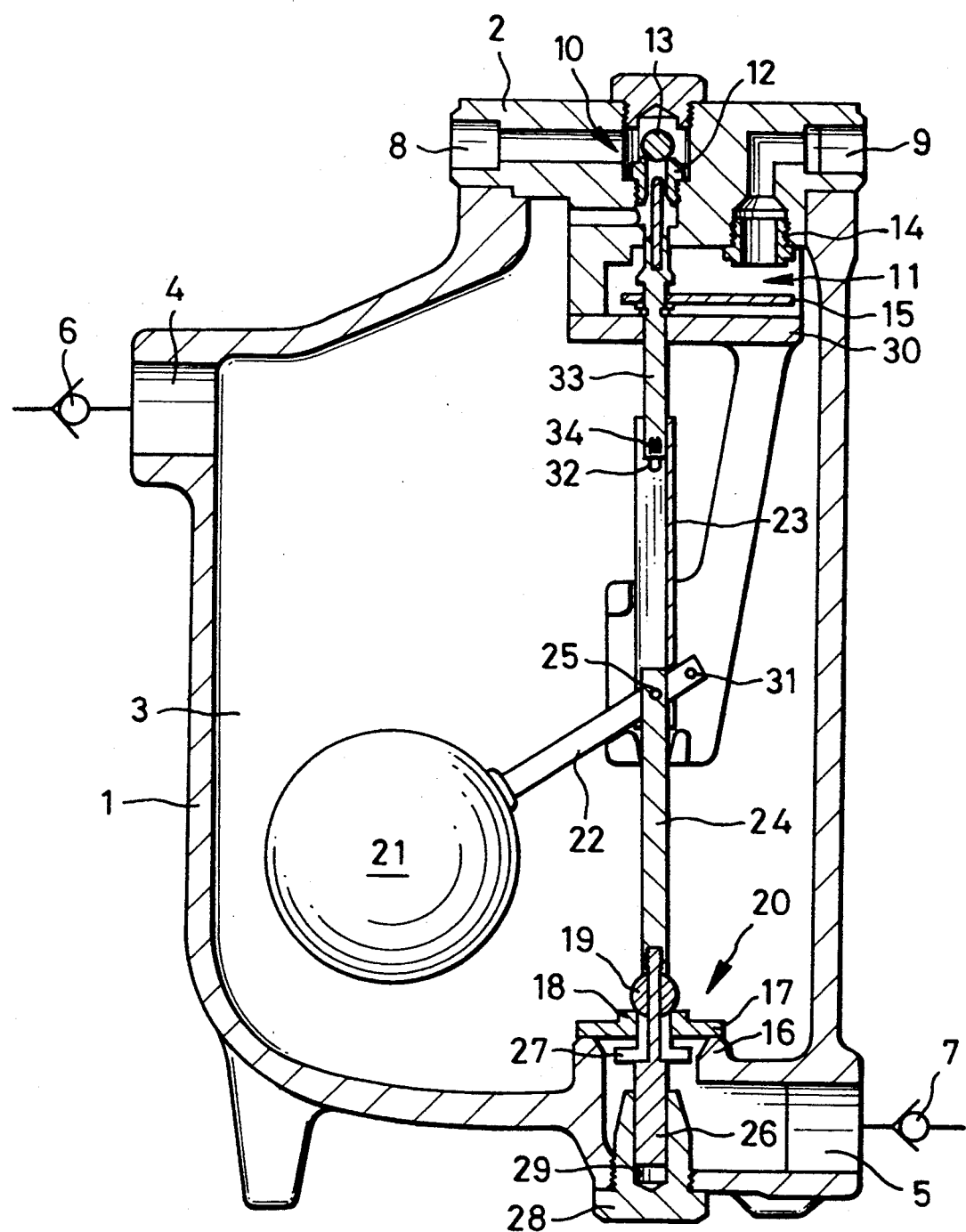

In the case where the primary pressure on the check valve 6 disposed at the condensate inlet opening 4 is lower than the secondary pressure on the check valve 7 disposed at the condensate outlet opening 5, the check valve 6 is opened to allow condensate to flow into the condensate receiving chamber 3, in the condition shown in FIG. 2. At this moment, the float 21 is at the lowermost position and the inlet valve 10 is closed and the exhaust valve 11 is opened on account of the relation in position between the connecting member 23 connected to the float 21 through the lever 22 and the valve rod 33. Furthermore, the valve means 20 is closed on account of the relation in position of the float shaft 24 connected to the float 21 through the lever 22.

Following the rise in the water level due to the inflow of condensate, the float 21 rises, causing the connecting member 23 and the float shaft 24 to be moved upwardly. As the float shaft 24 rises, the sub-valve body 19 is moved upwardly together with the guide rod 26 away from the sub-valve seat 18 to thereby open the sub-valve, and the pressure in the lower space of the valve means 20 becomes equal to that in the condensate receiving chamber 3 and, accordingly, to the primary pressure in the check valve 6. At this time, because of the higher secondary pressure, the check valve 7 at the condensate outlet opening 5 is maintained in the closed condition.

Figure 3:
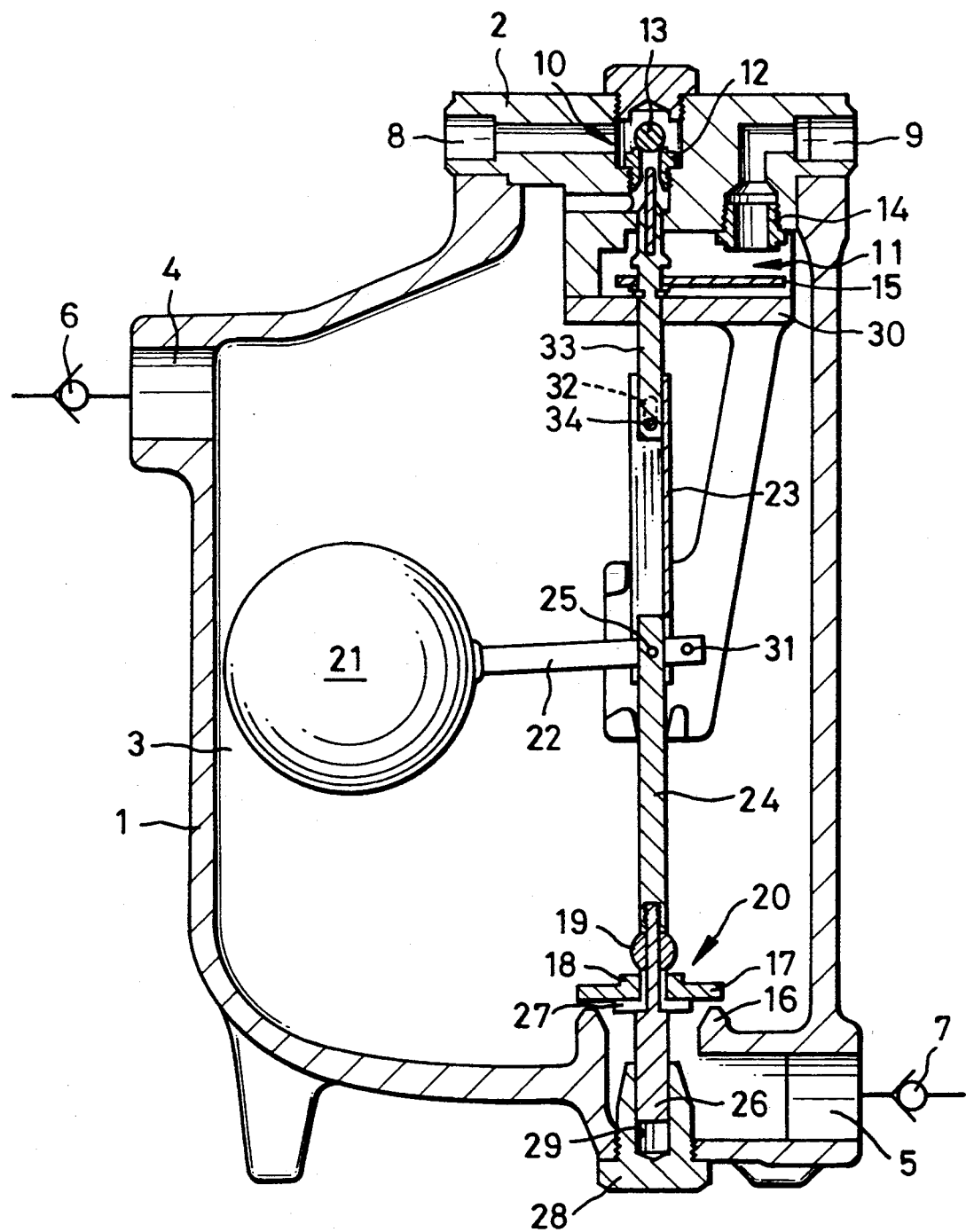

Upon further rising of the float 21, the supporting portion of the guide ribs 27 lifts up the main valve body 17 away from the main valve seat 16, as shown in the lower region of FIG. 3, so that the valve means 20 is entirely brought into a valve opening condition and the condensate outlet opening 5 can be opened, but the check valve 7 is still maintained in the closed condition.

The buoyance of the float 21 acts on the valve stem 33 from the moment when the float 21 rises to a predetermined position and the lower end in the free space 32 of the connecting member 23 comes into contact with the pin 34 of the valve stem 33 (FIG. 3). When the water level increases and the float rises to a higher position, the valve stem 33 also rises to lift up the inlet valve body 13 away from the inlet valve seat 12, thereby opening the inlet valve 10. Meanwhile, the exhaust valve body 15 comes into seating engagement with the exhaust valve seat 14, thereby closing the exhaust valve 11, as shown in FIG. 1.

The opened condition of the inlet valve 10 and the closed condition of the exhaust valve 11 cause an operating high Pressure fluid to flow from the inlet 8 through the inlet valve 10 into the condensate receiving chamber 3, so that the pressure in the condensate receiving chamber 3 is increased to close the check valve 6. When the pressure in the condensate receiving chamber 3 becomes higher than the secondary pressure on the check valve 7, the latter is opened and condensate is discharged from the condensate outlet opening 5.

Figure 4:
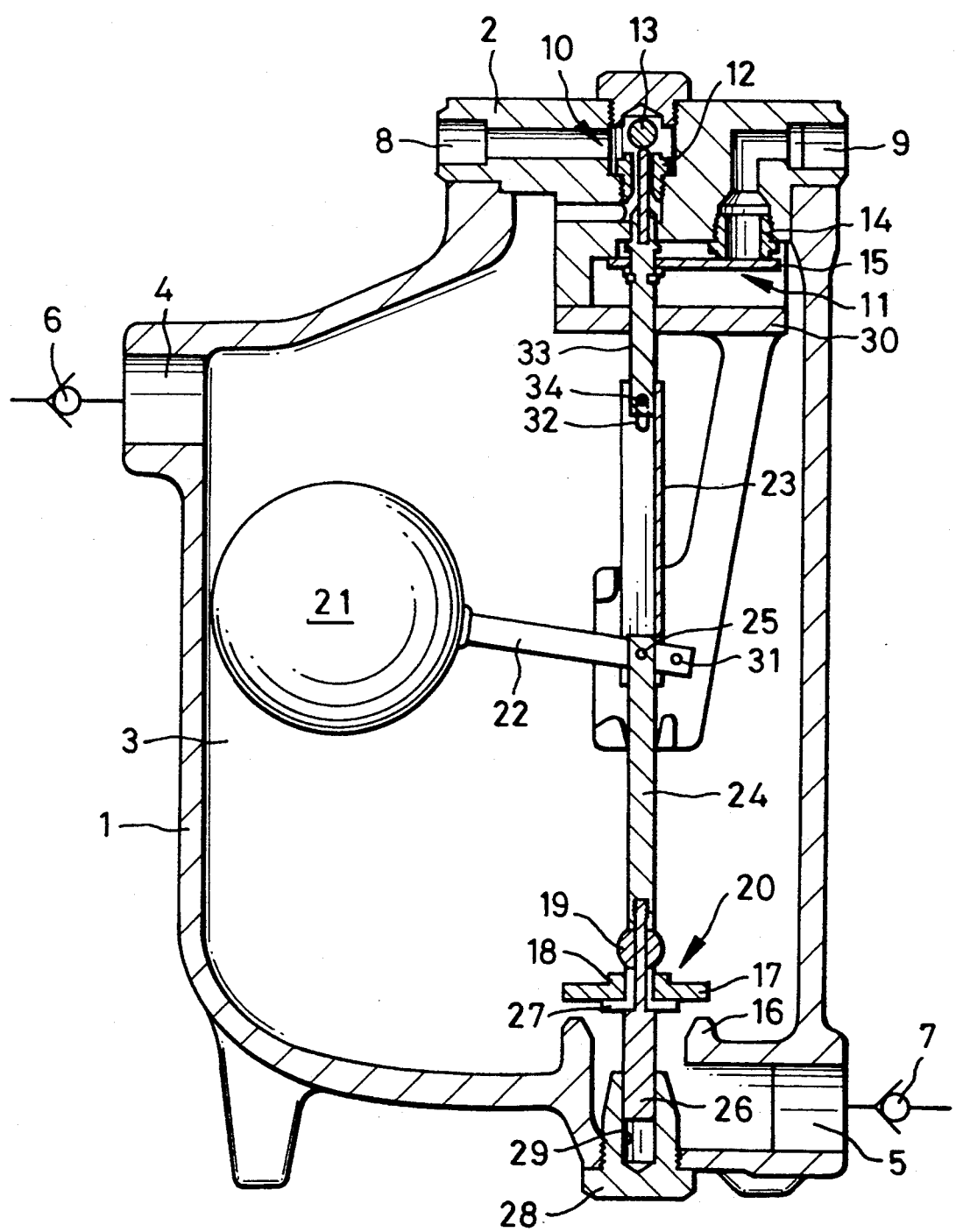

According to a drop in the water level due to the discharge of condensate, the float 21 drops, causing the connecting member 23 and the float shaft 24 to be moved downwardly, and accordingly, the valve means 20 starts to move towards a valve closing condition. As shown in FIG. 4, the valve stem 33 is caused to be moved downwardly from the moment when the float 21 drops to a predetermined position and the upper end of the free space 32 comes into contact with the pin 34 to thereby actuate the self-weight of the float 21 on the valve stem 33. The downward motion of the valve stem 33 causes the inlet valve 10 to be closed and the exhaust valve 11 to be opened. The closed condition of the inlet valve 10 and the opened condition of the exhaust valve 11 cause the pressure in the condensate receiving chamber 3 to be gradually decreased, and the discharge of condensate is carried out by the residual pressure.

Upon further dropping of the float 21, the main valve body 17 comes into seating engagement with the main valve seat 16 to thereby close the main valve. At the moment of engagement, the sub-valve body 19 does not come into seating engagement with the sub-valve seat 18, and therefore, condensate can be discharged from the communicating spaces between the adjacent guide ribs 27. Shortly, the sub-valve body 19 comes into seating engagement with the sub-valve seat 18, and thus, the entire valve means 20 closes the condensate outlet opening 5, causing the check valve 7 to be closed and returning to the condition of FIG. 2, in which the discharge of condensate is stopped. Then, the above-mentioned cycle is repeated.

In the case where the primary pressure is higher than the secondary pressure, both the check valve 6 and the check valve 7 can easily be brought into a valve opening condition in the condition of the device as shown in FIG. 2. When condensate flows from the condensate inlet opening 4 into the condensate receiving chamber 3, the float 21 rises as the water level rises, and accordingly, the connecting member 23 and the float shaft 24 are moved upwardly. The upward motion of the float shaft 24 causes the sub-valve body 19 to be moved away from the sub-valve seat 18, so that condensate is discharged through the communicating spaces between the adjacent guide ribs 27. A further rise of the float 21 due to an increased amount of condensate causes the main valve body 17 to be moved away from the main valve seat 16, thereby discharging a large quantity of condensate through the condensate outlet opening 5. Depending upon the velocity of inflow of condensate into the condensate receiving chamber 3, a rise of the float 21 bringing about an upward motion of the valve stem 33 through the connecting member 23, causing the inlet valve body 13 to be lifted up to thereby allow an operating high pressure fluid to flow into the condensate receiving chamber 3, can also occur. In this case, the operating high pressure fluid enhances the discharge of condensate, and also permits adjustment of the condition of opening the check valve 6 depending upon the degree of Pressure thereof.

The float 21 drops along with a fall of the water level due to the discharge of condensate, and first, the main valve body 17 comes into seating engagement with the main valve seat 16. Then, the sub-valve body 19 also comes into seating engagement with the sub-valve seat 18, so that the valve means 20 is closed, thereby causing the condensate outlet opening 5 to be closed.

Figure 5:
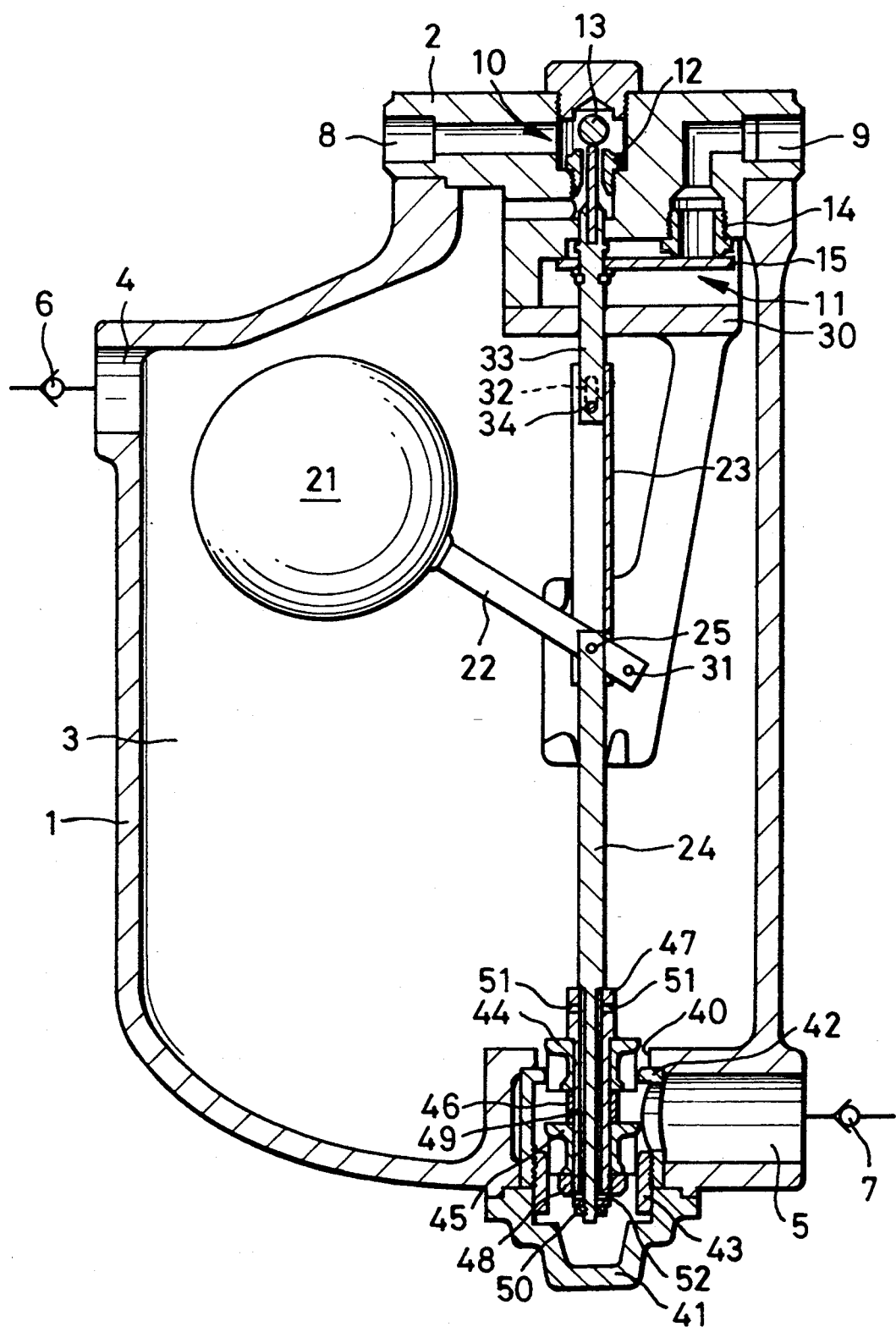
FIG. 5 is a sectional view corresponding to FIG. 1 of a condesate discharging device according to another embodiment of the invention.

FIG. 5 shows another embodiment in which the position of the float corresponds to that of FIG. 1. The construction of an entire condensate discharging device is basically identical to that of the above-mentioned embodiment, and the device in question comprises the condensate receiving chamber 3; the inlet valve 10 and the exhaust valve 11 for an operating high Pressure fluid arranged above the condensate receiving chamber 3; the condensate inlet opening 4; the condensate outlet opening 5; and the valve means for discharging condensate. The explanation of the parts common to those of the Previously described embodiment is omitted with like Parts given like reference characters for simplification of explanation, and herein, the construction of the valve means different from the previously described embodiment and the operation of the device will be described.

The condensate receiving chamber 3 is formed at the lower end thereof with an opening 40, which is closed with a lower lid 41 attached by means of bolts (not shown). An upper valve seat member having an upper valve seat 42 at the upper end thereof is disposed between the opening 40 and the lower lid 41, and at the same time, a lower valve seat member having a lower valve seat 43 at the upper end thereof is screwed into the inside lower portion of the upper valve seat member. The upper and lower valve seat members are retained by the lower lid 41.

In the region ranging from the upper valve seat member to the lower valve seat member, a stepped valve stem tube 47 is attached to the lower portion of the stepped float shaft 24 connected to the float 21 through the lever 22, in a manner concentric with the float shaft 24. The float shaft 24 extends through the valve stem tube 47 with a clearance 49 left therein and has at the lower end a nut 50 threadably connected thereto.

An upper valve body 44 adapted to come into and out of engagement with an upper valve seat 42 and a lower valve body 45 adapted to come into and out of engagement with a lower valve seat 43 are mounted on the outer periphery of the valve stem tube 47 through a connecting tube 46 therebetween, and are fixed by a nut 48 threadably connected to the lower end of the valve stem tube 47, with the upper end of the upper valve body 44 and the upper end of the valve stem tube 47 in abutting engagement with the step of the valve stem tube 47 and the step of the float shaft 24, respectively. The upper valve seat 42, upper valve body 44, lower valve seat 43 and lower valve body 45 constitute a composite seat valve. The upper and lower valve bodies 44 and 45 are provided with a plurality of vanes, respectively, which are used to guide the upper and lower valve seat members.

The valve stem shaft 47 is provided at the upper and lower portions thereof with through holes 51 and 52, respectively, so that the condensate receiving chamber 3 and the space underneath the lower valve body 45 communicate with each other through the clearance 49. This construction reduces the influence on the operations for opening and closing the valve due to a difference in pressure.

In the case where the primary pressure on the check valve 6 arranged at the condensate inlet opening 4 is lower than the secondary pressure on the check valve 7 arranged at the condensate outlet opening 5, the check valve 6 at the inlet opening 4 is opened and allows condensate to flow into the condensate receiving chamber 3. At this time, the float 21 is at the lowermost position, and the inlet valve 10 is closed and the exhaust valve 11 is opened on account of the relation in position of the connecting member 23 and valve stem 33 connected to the float 21 through the lever 22. Moreover, the upper and lower valve bodies 44 and 45 are brought into seating engagement the upper and lower valve seats 42 and 43, respectively, on account of the relation in position of the float shaft 24 connected to the float 21 through the lever 22.

Along with the rise in the water level due to inflow of condensate, the float 21 rises, causing the connecting member 23 and the float shaft 24 to rise. As the float shaft 24 rises, the composite seat valve also rises, causing the upper valve body 44 and the lower valve body 45 to be simultaneously disengaged from the upper valve seat 42 and the lower valve seat 43, respectively, to thereby open the composite seat valve, so that the pressure in the space between the opening 40 and the lower lid 41 becomes equal to that in the condensate receiving chamber 3, and accordingly, the primary pressure on the check valve 6. At this moment, since the secondary pressure is higher than the primary Pressure, the check valve 7 at the outlet opening 5 is kept closed.

The buoyance of the float 21 acts on the valve stem 33 from the moment when the float 21 rises to a predetermined position and the lower end in the free space 32 of the connecting member 23 comes into contact with the pin 34 of the valve stem 33. When the water level rises and the float 21 reaches a higher position, the valve stem 33 also rises, causing the inlet valve body 13 to be lifted up away from the inlet valve seat 12 so that the inlet valve 10 is opened. In the meanwhile, the exhaust valve body 15 comes into seating engagement with the exhaust valve seat 14 to thereby close the exhaust valve 11, as shown in FIG. 5.

The opened condition of the inlet valve 10 and the closed condition of the exhaust valve 11 cause the operating high pressure fluid to flow from the fluid inlet 8 through the inlet valve 10 into the condensate receiving chamber 3, thereby bringing about the rise in pressure within the condensate receiving chamber 3 to close the check valve 6. When the pressure within the condensate receiving chamber 3 becomes higher than the secondary pressure on the check valve 7, the check valve 7 is opened to allow condensate to be discharged from the outlet opening 5.

Along with a drop in the water level due to the discharge of condensate, the float 21 drops, causing the connecting member 23 and the float shaft 24 to move downwardly through the lever 22 toward the closing condition of the composite valve. The valve stem 33 is caused to move downward from the moment when the float 21 drops to a predetermined position and the upper end in the free space 32 comes into abutting engagement with the pin 34 so that the self-weight of the float 21 acts on the valve stem 33. The downward motion of the valve stem 33 shortly causes the inlet valve 10 to be closed and the exhaust valve 11 to be opened. The closed condition of the inlet valve 10 and the opened condition of the exhaust valve 11 cause the pressure within the condensate receiving chamber 3 to be gradually decreased, so that the discharge of condensate is carried out under the residual pressure.

Further dropping of the float 21 causes the upper valve body 44 and the lower valve body 45 to come into seating engagement with the upper valve seat 42 and the lower valve seat 43, respectively, to close the composite seat valve, so that the outlet opening 5 is closed, causing the check valve 7 at the outlet opening 5 to be closed and the discharge of condensate is stopped. Thus, the above-mentioned cycle is repeated.

In the case where the primary pressure is higher than the secondary pressure, both the check valves 6 and 7 can be easily opened together. When condensate flows from the inlet opening 4 into the condensate receiving chamber 3, the water level rises, causing the float 21 to rise to thereby move upwardly the connecting member 23 and the float shaft 24 through the lever 22. The rise of the float shaft 24 causes the upper valve body 44 and the lower valve body 45 to be disengaged from the upper and lower valve seats 42 and 43, respectively, to thereby discharge condensate from the outlet opening 5. Depending upon the velocity of inflow of condensate into the condensate receiving chamber 3, the buoyancy of the float 21 bringing about the rise of the valve stem 33 through the connecting member 23, thereby forcing the inlet valve body 13 upwardly to make the operating high pressure fluid to flow into the condensate receiving chamber 3, can occur. In this case, the operating high pressure fluid enhances the discharge of condensate, and the opening condition of the check valve 6 may be also adjusted depending upon the degree of pressure.

Along with a drop in the water level due to the discharge of condensate, the float 21 drops, causing the upper valve body 44 and the lower valve body 45 to come into seating engagement with the upper valve seat 42 and the lower valve seat 43, respectively, to close the composite seat valve so that the outlet opening 5 is closed.

What is claimed is:

1. A condensate discharging device comprising:

a condensate receiving chamber provided with a condensate inlet opening and a condensate outlet opening as well as an operating high pressure fluid inlet and outlet;

a float of one of an open and a closed type disposed within said condensate receiving chamber and adapted to rise and drop along with a predetermined water level;

an inlet valve connected to said float and used for opening and closing said high pressure fluid inlet;

an exhaust valve connected to said float and used for opening and closing said high pressure fluid outlet;

check valves, one arranged at said condensate inlet opening and the other at said condensate outlet opening; and a valve means connected to said float to open and close said condensate outlet opening independently of said check valves;

said valve means comprises a main valve seat formed on the end of said condensate outlet opening which opens toward said condensate receiving chamber; a main valve body adapted to come into and out of seating engagement with said main valve seat; a sub-valve seat formed on said main valve body; and a sub-valve body adapted to come into and out of seating engagement with said sub-valve seat partially independently of the engagement and disengagement of said main valve body with said main valve seat;

the engagement and disengagement of said sub-valve body with said sub-valve seat are carried out by the sliding motion of said main valve body along a plurality of guide ribs formed fixedly with said sub-valve body, said condensate receiving chamber and said condensate outlet opening communicating with each other through the spaces between adjacent guide ribs, and said communicating condition is opened and closed according to the engagement and disengagement of said sub-valve body with said sub-valve seat;

said valve means being adapted to close said condensate outlet opening when the float is in its lowest position, and to open said condensate outlet opening as the float rises, so that an area of a passage between the receiving chamber and the condensate outlet opening gradually increases;

whereby said float operates to close said high pressure fluid inlet and open said high pressure fluid outlet, the condensate is introduced from said condensate inlet opening into said condensate receiving chamber, until the water level in said condensate receiving chamber reaches a predetermined water level; as the float rises, along with the water level, condensate is discharged through said condensate outlet opening; and said high pressure fluid outlet is closed and said high pressure fluid inlet is opened, when said predetermined water level is reached, thereby discharging the condensate from said condensate outlet opening by introducing a high pressure fluid through said high pressure fluid inlet.

* * * * *